(12) United States Patent
Scherf et al.

(10) Patent No.: US 10,412,872 B2
(45) Date of Patent: Sep. 17, 2019

(54) SOIL WORKING TOOL

(71) Applicants: AMAZONEN-WERKE H. DREYER GMBH & CO. KG, Hasbergen-Gaste (DE); BETEK GMBH & CO. KG, Aichhalden (DE)

(72) Inventors: Silvio Scherf, Hecklingen OT Cochstedt (DE); Joachim Polster, Leipzig (DE); Ulrich Krämer, Wolfach (DE); Fabian Seifried, Herrenzimmern (DE)

(73) Assignees: AMAZONEN-WERKE H. DREYER GMBH & CO. KG, Hasbergen-Gaste (DE); BETEK GMBH & CO. KG, Aichhalden (DE)

( * ) Notice: Subject to any disclaimer, the term of this patent is extended or adjusted under 35 U.S.C. 154(b) by 0 days.

(21) Appl. No.: 15/519,455

(22) PCT Filed: Oct. 20, 2015

(86) PCT No.: PCT/EP2015/074220
§ 371 (c)(1),
(2) Date: Apr. 14, 2017

(87) PCT Pub. No.: WO2016/062694
PCT Pub. Date: Apr. 28, 2016

(65) Prior Publication Data
US 2017/0223887 A1 Aug. 10, 2017

(30) Foreign Application Priority Data
Oct. 20, 2014 (DE) .................. 10 2014 115 209

(51) Int. Cl.
*A01B 15/04* (2006.01)
*A01B 23/02* (2006.01)
(Continued)

(52) U.S. Cl.
CPC .............. *A01B 15/04* (2013.01); *A01B 23/02* (2013.01); *A01B 15/02* (2013.01); *A01B 15/06* (2013.01); *A01B 35/225* (2013.01)

(58) Field of Classification Search
CPC .......... A01B 15/02; A01B 15/04; A01B 23/02
(Continued)

(56) References Cited

U.S. PATENT DOCUMENTS 1,639,777 A * 8/1927 Lewis ..................... A01B 35/22
172/697
3,225,467 A * 12/1965 Troeppl .................. A01B 13/00
37/452
(Continued)

FOREIGN PATENT DOCUMENTS

CN 102984932 A 3/2013
CN 103270824 A 9/2013
(Continued)

OTHER PUBLICATIONS

Iin1Irnational Preliminary Report on Patentability and Written Opinion of the International Searching Authority in application PCT/EP2015/074220 dated May 4, 2017, translation as issued by WIPO provided. References cited in previous IDS.
(Continued)

*Primary Examiner* — Thomas B Will
*Assistant Examiner* — Joel F. Mitchell
(74) *Attorney, Agent, or Firm* — Hassan Abbas Shakir; Shakir Law PLLC

(57) ABSTRACT

Soil working tool for an agricultural machine, in particular a cultivator, which is fixed on a tool holder and has a tine-like region to which a preferably guide plate-like element is attached. In order to achieve an improved soil flow across the soil working tool with good wear protection and thus a sufficient service life of the soil working tool, the (Continued)

tine-like region has two side strips which run in the longitudinal direction of the soil working tool and have notch-like recesses extending in the transverse direction, and that an at least approximately smooth center strip region is located between the two side strips in the center in the longitudinal direction of the tine-like region of the soil working tool.

11 Claims, 2 Drawing Sheets

(51) Int. Cl.
  *A01B 15/02* (2006.01)
  *A01B 15/06* (2006.01)
  *A01B 35/22* (2006.01)
(58) Field of Classification Search
  USPC .......................................................... 172/713
  See application file for complete search history.

(56) References Cited

U.S. PATENT DOCUMENTS

| | | | | | |
|---|---|---|---|---|---|
| 4,275,792 | A | * | 6/1981 | Jensen et al. | A01B 35/22 172/703 |
| 4,754,816 | A | * | 7/1988 | Edmission | A01B 23/02 172/747 |
| 4,932,478 | A | * | 6/1990 | Jones | A01B 15/025 172/699 |
| 5,111,600 | A | * | 5/1992 | Lukavich et al. | E02F 9/285 37/452 |
| 5,350,022 | A | * | 9/1994 | Launder et al. | A01B 15/025 172/700 |
| 5,502,905 | A | * | 4/1996 | Cornelius et al. | E02F 9/285 37/454 |
| 6,490,816 | B2 | * | 12/2002 | Ketting | E02F 9/2858 172/753 |
| 2002/0043010 | A1 | | 4/2002 | Ketting | |
| 2006/0231275 | A1 | | 10/2006 | Bull et al. | |
| 2013/0240225 | A1 | * | 9/2013 | Widmaier et al. | A01B 35/26 172/762 |
| 2016/0014950 | A1 | | 1/2016 | Smeets | |

FOREIGN PATENT DOCUMENTS

| | | |
|---|---|---|
| DE | 102012111138 A1 | 6/2014 |
| EP | 2 591 648 A1 | 5/2013 |
| FR | 2679099 A1 | 1/1993 |
| GB | 2 402 313 A | 8/2004 |
| WO | 2014139733 A2 | 9/2014 |

OTHER PUBLICATIONS

International Search Report dated Apr. 28, 2016 in PCT/EP2015/074220, translation as issued by WIPO provided.
Written Opinion of the International Search Authority, dated Apr. 28, 2016 in PCT/EP2015/074220, translation through translate.google.com provided.
Office Action dated Dec. 19, 2018 by the Chinese State Intellectual Property Office in related Chinese patent application 201580056876.0, partial translation provided.
Office Action dated Dec. 21, 2018 by the Canadian Intellectual Property Office in related Canadian patent application 2964224.
Office Action dated Apr. 11, 2018 by the Canadian Intellectual Property Office in related Canadian patent application 2964224.
Office Action dated Oct. 30, 2018 by the Eurasian Patent Office in related Eurasian patent application 201790878, partial translation provided.
Office Action dated Jun. 6, 2018 by the European Patent Office in related EPO patent application EP 15787 920.60-1006, partial translation provided.
Response dated Sep. 25, 2018 to Office Action issued Jun. 6, 2018 by the European Patent Office in related EPO patent application EP 15787 920.60-1006, partial translation provided.
Office Action dated Jun. 14, 2019 by the European Patent Office in related application EP 15 787 920.6-1006, translation provided.

* cited by examiner

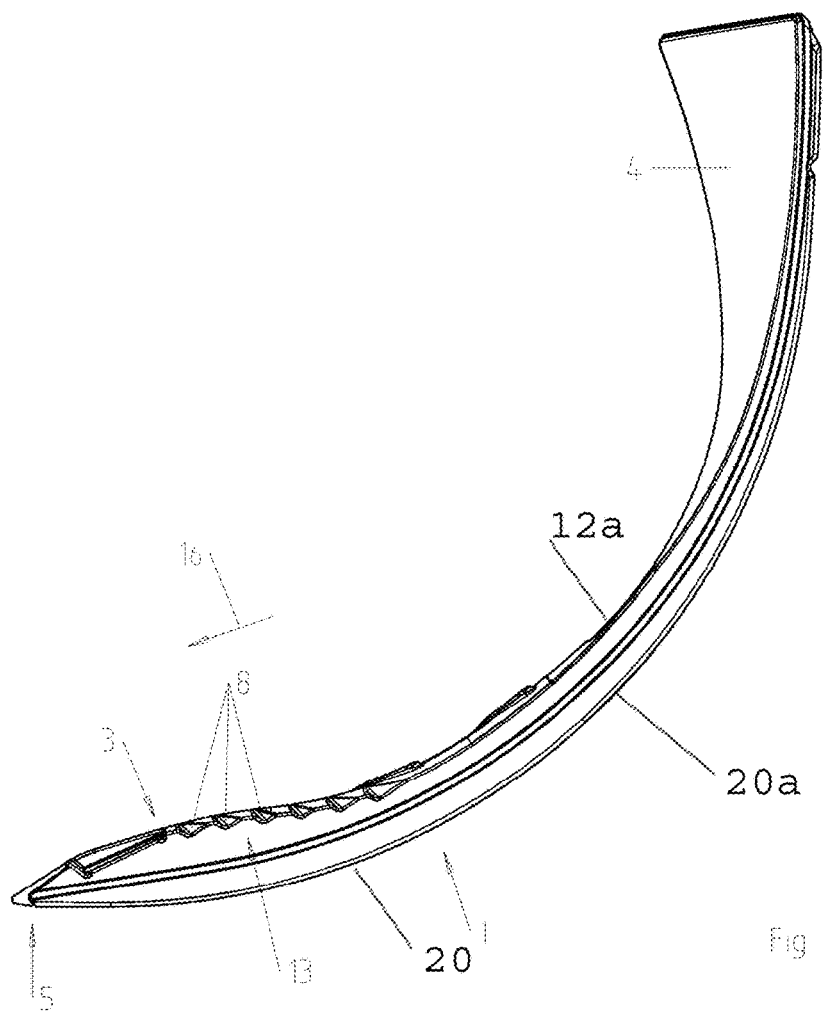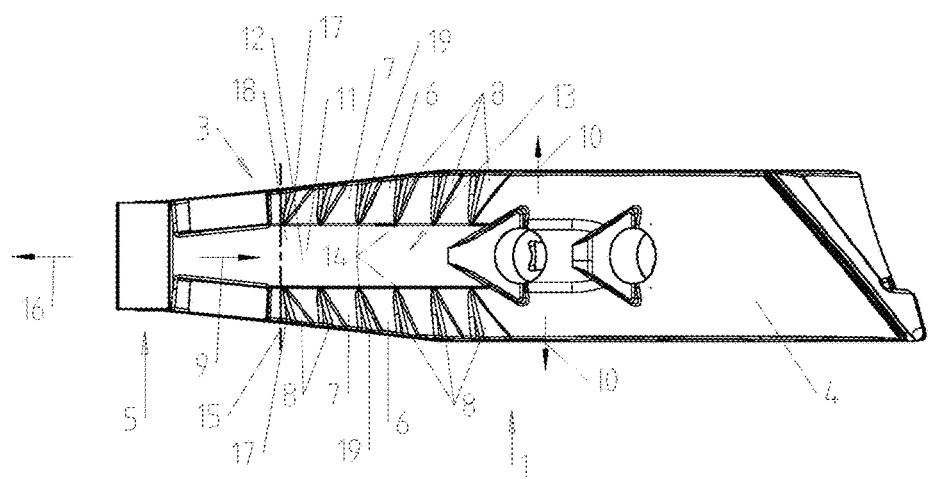

SOIL WORKING TOOL

BACKGROUND OF THE INVENTION

1. Field of the Invention

The invention relates to a soil-working tool for an agricultural machine, in particular a cultivator blade, which is fastened on a tool holder and which a tine-like region, which is adjoined by a preferably guide-plate-like element.

2. Discussion of the Related Art

A soil-working tool is described in DE 10 2012 111 138 A1. This soil-working tool is designed in the form of a cultivator blade. Cladding in the form of hard-metal plates is fitted in the region of the tip of the tine in order to achieve a longer service life, for the cultivator blade, i.e. in order for the latter to be subjected to a lower level of wear.

Also known in practice are cultivator blades which have notch-like depressions at a distance from the tip of the tine and from one another. These notch-like depressions are configured in a symmetrical manner and such that they extend outward in each case from the longitudinal center line of the blade. The longitudinal center line of the notch-like depressions here run transversely in relation to the longitudinal center line of the blade and/or transversely to the direction of travel of the soil-working apparatus on which the soil-working tool is arranged. The tips of the notch-like in depressions come into direct contact with one another in the center, along the longitudinal center line of the blade.

SUMMARY OF THE INVENTION

The invention is based on the object of achieving an improved flow of soil over the soil-working tool, with a good level of wear protection and therefore a sufficient service life for the soil-working tool.

This object of the achieved according to the invention in that the tine-like region has two side strips, which run in the longitudinal direction of the soil-working tool and have notch-like depressions extending in the transverse direction, and in that, between the two side strips, an at least more or less smooth central-strip region is located in the center, a in the longitudinal direction of the tine-like region of the soil-working tool.

This measure gives rise, first of all, to an improved flow of the broken-up soil over the tine-like region, in which the notch-like depressions are arranged, with a sufficient level of wear protection. In addition, in many cases, the soil-working machines become more lightweight as a result.

It has been found to be advantageous in many cases that in its tine-like region, the cross section of the soil-working tool is curved convexly upward on its upper side, and the at least more or less smooth central-strip region is located in the upper convexly curved region, and that the notch-like depressions are located in the side region, which slopes down laterally from the central region. This gives rise, in many cases, to an improved flow of soil and to improved breaking up/mixing of the soil.

One embodiment makes provision for the two side strips, which are provided with notch-like depressions, and the at least more or less smooth central strip each to be at least more or less of the same width. This results in the notch-like depressions being assigned in optimized fashion to the more or less smooth central strip.

Tests have shown that it is advantageous for more than three notch-like depressions to be arranged one behind the other in each side strip.

BRIEF DESCRIPTION OF THE DRAWINGS

Further details of the invention can be gathered from the description of the examples and from the drawings, in which:

FIG. 2 shows a side view of the soil-working tool, and FIG. 3 shows a front view of the soil-working tool.

DETAILED DESCRIPTION OF THE INVENTION

Figure 1:
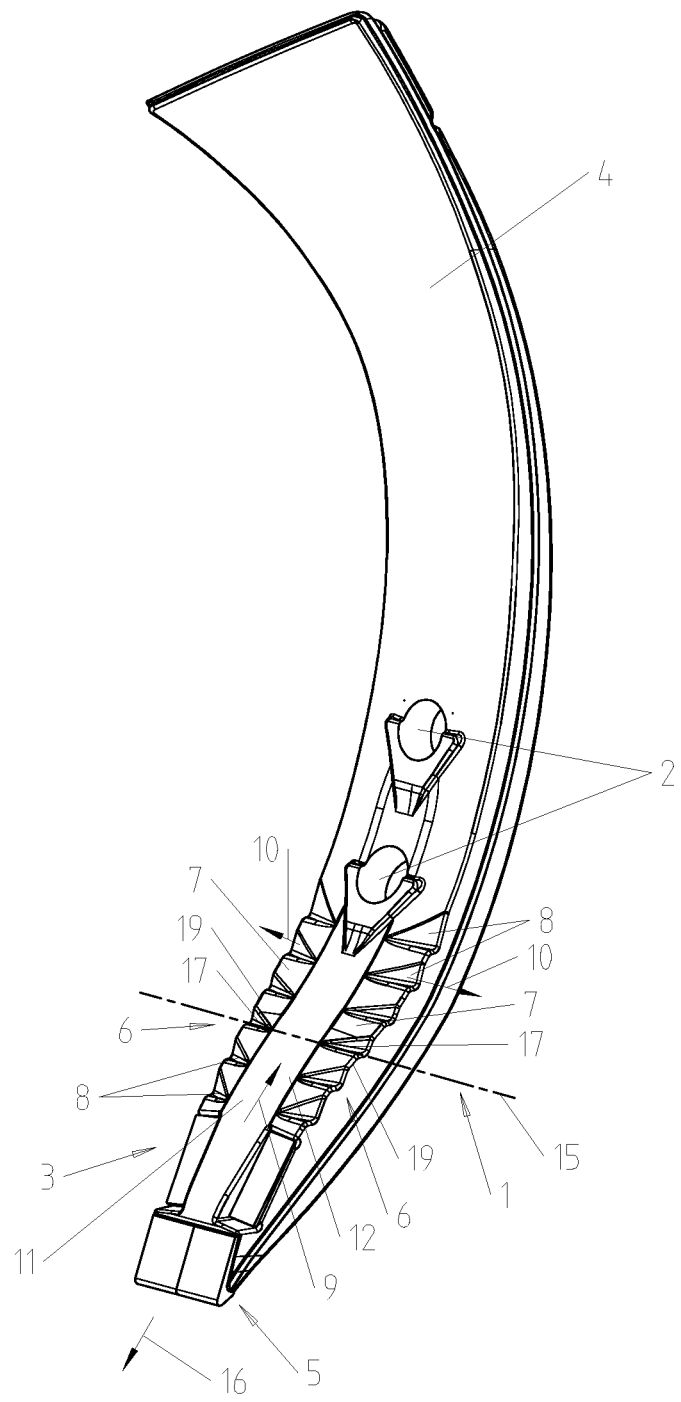
FIG. 1 shows a perspective illustration of the soil-working tool according to the invention.

The soil-working tool for an agricultural machine, said tool being designed in the form of a cultivator blade 1, is fastened, in a manner which is not illustrated, on a tool holder, which is not illustrated either, by way of fastening means, for example screws, which can be fitted through the through-passages 2 arranged in the soil-working tool 1. The soil-working tool 1 has a front tine-like region 3, which is adjoined by a guide-plate-like element 4, which, as illustrated in the exemplary embodiment, is a self-contained unit.

Hard-metal plates 6, which may stand for example from tungsten carbide, are arranged on the tip 5 of the tine, said tip being located at the beginning of the tine-like region 3. Side strips 7, in which notch-like depressions 8 are arranged, begin on either side 6 of the cultivator blade 1, at a distance from the tip 5 of the tine. The tine-like region 3 thus has two side strips 7, which run in the longitudinal direction 9 of the cultivator blade 1 and have notch-like depressions widening outward in the transverse direction 10. Between the two side strips 7, an at least more or less smooth central-strip region 11 is located in the center of the cultivator blade 1, in the longitudinal direction 9 of the tine-like region 3 of the cultivator blade 1. More than three, in the exemplary embodiment six, notch-like depressions 8 are arranged in each side strip 7. The two side strips 7, which are provided with notch-like depressions 8, and the at least more or less smooth central strip 11 are each at least more or less of the same width.

In its tine-like region 3, the cross section of the soil-working tool 1 is curved convexly upward on its upper side 12 and lower side 20, and the at least more or less smooth central-strip region 11 is located in the upper convexly curved region 13. The notch-like depressions 8 are located in the side region 7, which slopes down laterally from the central region 11. Upper side 12 comprises a first curve 12a and lower side 20 comprises a second curve 20a, wherein the first curve and the second curve are curved in a similar direction.

The leading edge 14 of the notch-like depressions 8, as seen in each case in the direction of the tip 5 of the tine-like region 3, runs at least more or less parallel to a line 15 in the direction transverse to the direction 16 of travel of the machine and at least more or less horizontally. The trailing edge 17 of the notch-like depressions 8, as seen in the direction of the tip 5 of the tine-like region 3, runs obliquely away from the tip 5 of the tine-like region, at least at an angle of 25°, preferably 35°, in relation to the leading edge 14 of the respective notch-like depression, as it extends from the inner region 18 of the tine-like region 3 to the outer region 19 of the tine-like region 3.

The leading edges 14 of the notch-like depressions 8, which are located opposite one another in each case on the left-hand and right-hand sides, are located at least more or less on to a line 13 which runs through the leading edges 14.

What is claimed is:

1. A soil-working tool for an agricultural machine, the soil working tool comprising:
    a cultivator blade fastened on a tool holder, the cultivator blade defining a longitudinal direction and a transverse direction, the cultivator blade comprising
        an upper side and a lower side, the upper side comprising a first curve and the lower side comprising a second curve, the first curve and the second curve being curved in a similar direction;
        a guide-plate-like element, and
        a tine-like region adjoined by the guide-plate-like element;
    wherein the tine-like region comprises two side strips and a central-strip region disposed between the two side strips,
        each side strip extending in the longitudinal direction,
        each side strip comprising a plurality of notch-like depressions extending in the transverse direction, and
        the central-strip region being smooth,
        wherein the tine-like region comprises a cross section that is curved convexly upward on the upper side of the tine-like region,
    wherein the central-strip region is located in an upper convexly curved region of the tine-like region.

2. The soil-working tool as claimed in claim 1, wherein a notch-like depression of the plurality of notch-like depressions is located in a side region of the tine-like region, the side region sloping down laterally from the central region.

3. The soil-working tool as claimed in claim 2, wherein each side strip and the central strip comprises the substantially same width.

4. The soil-working tool as claimed in claim 1, wherein at least six notch-like depressions of plurality of notch-like depressions are arranged serially in each side strip.

5. The soil-working tool as claimed in claim 1, further comprising a through-passage disposed from the upper side to the lower side, the through-passage for receiving a fastener.

6. The soil-working tool as claimed in claim 1, wherein at least one notch-like depression of the plurality of notch-like depressions widens outward in a transverse direction.

7. A soil-working tool for an agricultural machine, the soil working tool comprising:
    a cultivator blade fastened on a tool holder, the cultivator blade defining a longitudinal direction and a transverse direction, the cultivator blade comprising
        an upper side and a lower side;
        a through-passage disposed from the upper side to the lower side, the through-passage for receiving a fastener;
        a guide-plate-like element; and
        a tine-like region adjoined by the guide-plate-like element;
    wherein the tine-like region comprises two side strips and a central-strip region disposed between the two side strips,
        each side strip extending in the longitudinal direction,
        each side strip comprising a plurality of notch-like depressions extending in the transverse direction, and
        the central-strip region being smooth;
        wherein at least one notch-like depression of the plurality of notch-like depressions widens outward in a transverse direction.

8. The soil-working tool as claimed in claim 7, wherein the tine-like region comprises a cross section that is curved convexly upward on an the upper side of the tine-like region,
    wherein the central-strip region is located in an upper convexly curved region of the tine-like region, and
    wherein a notch-like depression of the plurality of notch-like depressions is located in a side region of the tine-like region, the side region sloping down laterally from the central region.

9. The soil-working tool as claimed in claim 8, wherein at least one side strip of the two side strips comprises a notch-like depression, and
    wherein each side strip and the central strip comprises the substantially same width.

10. The soil-working tool as claimed in claim 7, wherein at least six notch-like depressions of plurality of notch-like depressions are arranged serially in each side strip.

11. The soil-working tool as claimed in claim 7, wherein the upper side comprising a first curve and the lower side comprising a second curve, the first curve and the second curve being curved in a similar direction.

* * * * *